April 15, 1930. L. R. BUCKENDALE 1,754,604
AUTOMOTIVE DRIVING CONSTRUCTION
Filed May 17, 1929
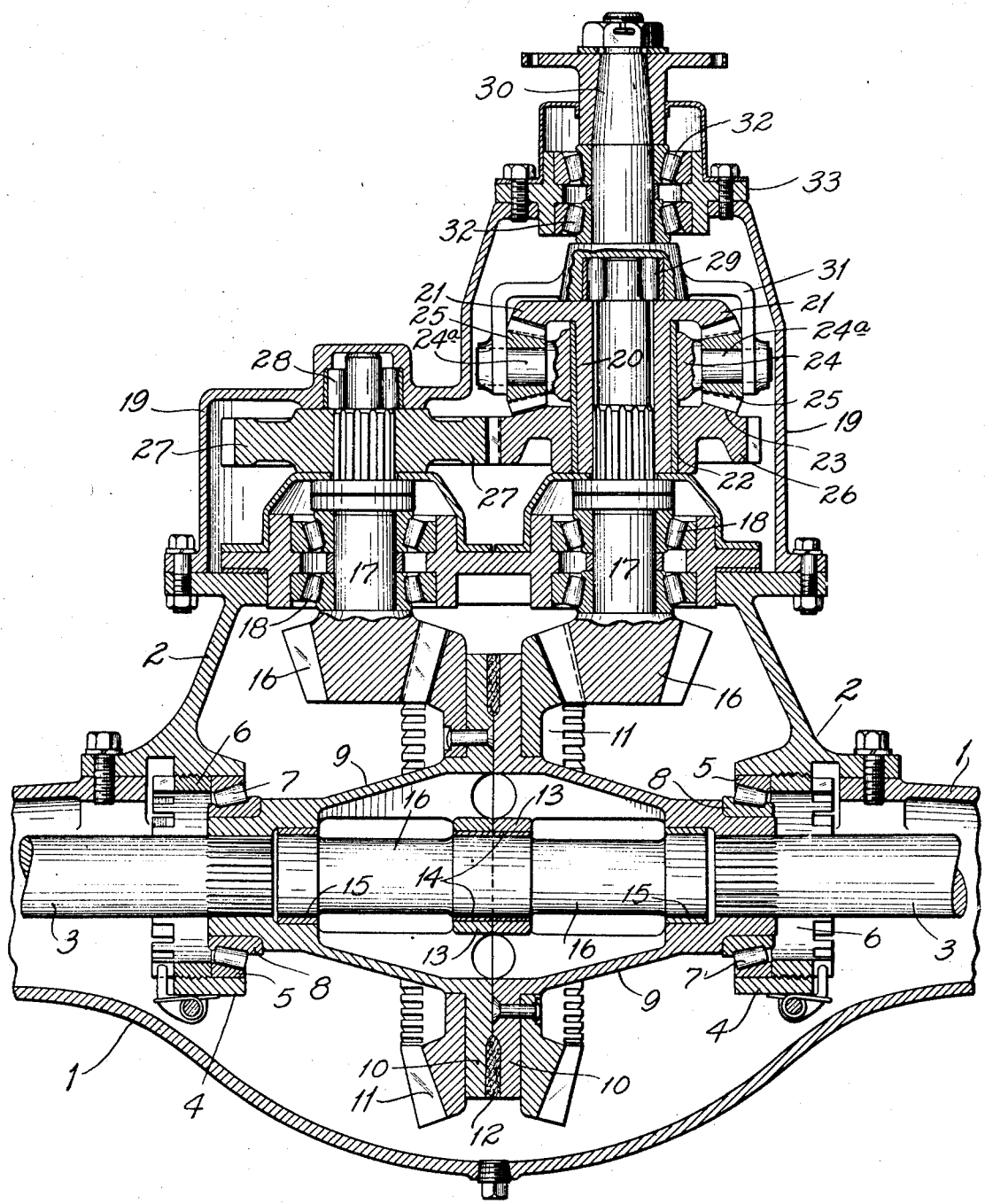
INVENTOR:
Lawrence R. Buckendale
HIS ATTORNEYS.

Patented Apr. 15, 1930

1,754,604

UNITED STATES PATENT OFFICE

LAURENCE R. BUCKENDALE, OF DETROIT, MICHIGAN, ASSIGNOR TO THE TIMKEN-DETROIT AXLE COMPANY, OF DETROIT, MICHIGAN, A CORPORATION OF OHIO

AUTOMOTIVE DRIVING CONSTRUCTION

Application filed May 17, 1929. Serial No. 363,922.

At the present time, the common type of bevel gear drive axle construction comprises a bevel gear on the propeller shaft that engages a bevel ring gear inside of which is housed differential mechanism that is operatively connected to the respective driving shaft sections that are connected to the road wheels. While this arrangement is very satisfactory for low-powered vehicles, it is impracticable for use with high-powered vehicles due to the necessity for making the ring gear larger than the requirements of road clearance will permit. The principal object of the present invention is to overcome this disadvantage of a bevel gear drive and make the same practicable for high-powered vehicles. The invention consists principally in coupling the propeller shaft to the driving spider of a differential mechanism and gearing the driven members of such differential mechanism to the respective axle shafts as hereinafter described. It also consists in mounting back to back on adjacent ends of the axle shafts bevel gear rings that mesh respectively with pinions on shafts that are geared to the respective driven members of a differential mechanism operatively connected to the propeller shaft. It also consists in the parts and in the arrangements and combinations of parts hereinafter described and claimed.

The accompanying drawing, which forms part of this specification, is a longitudinal section of a driving axle construction embodying my invention.

The present axle comprises a hollow housing 1 of ordinary type having an opening in the side thereof, and a gear carrier unit 2 mounted on said housing with a portion thereof extending through said opening into said housing. The middle portion of the axle housing is enlarged to accommodate the members that engage and drive the driving shaft sections 3. The carrier unit 2 comprises split ring hangers 4 of the common type that project through the hole in the front of the housing and serve as supports for roller bearing cups 5, said split rings being also threaded on the inside to receive castellated adjusting nuts 6 that serve as abutments for said bearings cups. Inside of each bearing cup 5 is a series of tapered rollers 7 mounted on a cone or inner raceway member 8 which in turn is mounted on the hub or outer tubular end of one of two alined spiders 9. The spiders 9 are longitudinally elongated and have their adjacent ends arranged back to back and widened in the form of radially extending flanges 10; and to the outer faces of said flanges are riveted or otherwise secured bevel ring gears 11. For the sake of lubrication, the outer peripheral portion of the meeting faces of the two spiders are offset to form an annular space for a grease ring 12.

As stated above, the outer end of each spider 9 is mounted in the hanger 4 provided therefor on the gear carrier 3, while the inner ends of said spiders are disposed back to back but are not fastened together. In order to provide proper support for the inner ends of said spiders, hollow hubs 13 are formed in said ends in alinement with each other, and these hubs are lined with a suitable bearing bushing or bushings 14. In like manner, suitable bushings 15 are mounted in the spiders near the outer hubs thereof. Mounted in these bushings is a beam or mandrel 16 whose middle portion is journaled in the bushings 14 that line the inner ends of the two spiders, and whose ends are journaled in the bushings 15 in the outer end portions of the respective spiders. By this arrangement, the beam or mandrel is supported at its ends by the outer end portions of the spiders and thus indirectly by the carrier, and itself supports the inner ends of said spiders. The axle shafts 3 have splines at their inner ends by which they engage similar sprines inside the hubs of the spiders 8. By this arrangement, the motion of each ring gear 11 is transmitted through its spider directly to the axle shaft 3 splined thereon independently of the drive of the other ring gear.

The respective ring gears 11 mesh with bevel pinions 16 on parallel shafts 17 that are mounted in suitable roller bearings 18 on a member 19 that is secured to a gear carrier and forms part of the gear carrier unit. Both of these shafts are driven from the same propeller shaft as hereinafter described. One of said shafts (namely, the one shown on the right in the drawing) has a sleeve or tubular member 20 splined thereon, and the outer end of said sleeve is radially enlarged and provided with bevel gear teeth on its inner face to constitute one of the driven gears 21 of a differential mechanism. Surrounding said sleeve is a bushing 22 on which is mounted the second driven bevel gear 23 of said differential mechanism with its teeth facing the teeth of said first driven gear 21. Also mounted on said sleeve is a spider 24 that is located between the bevel gears 21 and 23, and has radially disposed cylindrical arms 24$^a$ on which are journaled bevel pinions 25 that mesh with both of said bevel gears.

As stated above, the first driven bevel gear 21 is splined to the pinion shaft shown at the right in the drawing. The second driven bevel gear 23 is journaled on the sleeve 20 of said first mentioned bevel gear and has its peripheral portion toothed to constitute a spur gear 26. This spur gear meshes with a spur gear 27 of the same diameter that is splined or otherwise secured to the pinion shaft shown at the left in the drawing of the bevel pinion. The outer end of this last mentioned pinion shaft is mounted in a roller bearing 28 provided therefor in a pocket in the end wall of the member 19 of the gear carrier 3. The outer end of the first mentioned pinion shaft is likewise seated in a roller bearing 29 in a pocket provided therefor in the end of the propeller shaft 30, which shaft has angle shaped arms 31 with radial bores adapted to receive the radially extending arms 24$^a$ of the spider 24 of the differential mechanism that is mounted on the sleeve 20. The propeller shaft 30 is itself mounted in suitable roller bearings 32 provided therefor in the plate 33 that is secured to the outer end of the member 19 of the gear carrier 2.

The operation of the construction hereinbefore described is as follows: Assuming that the road wheels offer equal resistance, the power of the motor is transmitted, through the propeller shaft 30, the spider 24 mounted thereon and the pinions on the spider 25 to both bevel gears 21 and 23 of the differential mechanism. As bevel gear 21 is splined to shaft 17 at the right, the power is transmitted through said shaft and its pinion 16 to the ring gear 11 meshing therewith and thence to the axle section 3 driven by said ring gear. As the bevel gear 23 is integral with spur gear 26, motion is transmitted through the two spur gears 26 and 27 to the pinion shaft 17 at the left and thence through the pinion 16 thereof to the bevel ring gear 11 meshing therewith and thence to the axle shafts splined in the spider 9 of said ring gear. In such case, the two ring gears 11 that are arranged back to back turn synchronously without any movement relative to each other. When, however, the road wheels offer different resistances, the differential mechanism responds in the same manner as the differential mechanism in the common type of automotive axle construction. In such case, the two ring gears 11 turn relatively to each other conformably to the necessities of the case.

Inasmuch as the differential mechanism is shifted entirely away from the axle shafts, it is practicable to design and to proportion the ring gears without any reference to the differential mechanism; and therefore, it is feasible to make the ring gears of considerably smaller diameter than is feasible when the differential mechanism must be housed inside thereof. Likewise, as each of the ring gears drives only one axle shaft, applicant's arrangement divides between the two ring gears the work that has heretofore been done by a single ring gear. Consequently, it is feasible with applicant's arrangement to reduce the diameters of the two ring gears below what would be feasible with a single ring gear of equal capacity. The size of the ring gear is obviously a very important factor in determining the ground clearance of the driving axle construction, and has heretofore limited the use of a bevel drive to relatively light power vehicles; and it is a great and obvious advantage of the present invention that, by making it feasible to keep the size of the ring gears within requisite limits, it makes the use of a bevel drive feasible for high powered vehicles.

What I claim is:

1. An automotive axle construction comprising a hollow housing, axle shafts arranged in said housing, gears journaled in said housing and cooperating with the adjacent ends of the respective axle shafts for driving the same, and a member for rotatably supporting the adjacent ends of said gears.

2. An automotive axle construction comprising a housing, bevel gears arranged back to back having their outer ends journaled in said housing, a beam with its ends journaled in the outer end portions of said gears and with its middle portion supporting the inner ends of said gears, and axle shafts removably engaged with said gears respectively.

3. An automotive axle construction comprising a hollow housing, a gear carrier removably mounted thereon and having alined hangers inside of said housing, bevel gears arranged back to back with their outer ends journaled in said hangers, a beam with its ends journaled in the outer end portions of said gears and with its middle portion supporting the inner ends of said gears, and axle shafts removably engaged with said gears respectively.

4. An automotive construction comprising a hollow housing, axle shafts therein having gears at their inner ends, and parallel shafts having pinions meshing with said gears respectively and also having gears that are connected through a differential mechanism to a propeller shaft, and a gear carrier removably secured to said hollow housing and supporting said axle shaft gears, said parallel shafts and their pinions and gears, said differential mechanism and said propeller shaft.

5. An automotive construction comprising a hollow housing, axle shafts therein having gears at their inner ends, parallel shafts having intermeshing gears thereon and also having pinions meshing with the gears at the inner ends of the respective axle shafts, and a gear carrier removably secured to said hollow housing and rotatably supporting said shaft gears and said parallel shafts.

6. An automotive construction comprising a hollow housing, axle shafts therein having bevel gears at their inner ends arranged back to back, a gear carrier removably mounted on said housing and comprising means for supporting the respective axle shafts, and parallel shafts having bevel pinions meshing with said gears respectively and also having spur gears that are connected through a differential mechanism to a propeller shaft, said bevel gears, parallel shafts, bevel pinions, spur gears, differential mechanism, and propeller shaft being all mounted in said gear carrier and removable therewith from said axle housing as a unit.

7. An automotive construction comprising a hollow housing, a gear carrier removably mounted thereon and having alined hangers inside of said housing, two alined spiders arranged end to end and provided at their outer ends with elongated hub portions journaled in said hangers, gears secured to said spiders, a member with its ends journaled in the hub portions of said spiders and with its middle portion supporting the adjacent inner ends of said spiders, and axle shafts removably engaged with the hubs of said spiders respectively.

8. An automotive construction comprising a hollow housing, a gear carrier removably mounted thereon and having alined hangers inside of said housing, two alined spiders arranged end to end and provided at their outer ends with elongated hub portions journaled in said hangers, bevel ring gears secured to said spiders, a member with its ends journaled in the hub portions of said spiders with its middle portion supporting the adjacent ends of said spiders, axle shafts removably engaged with the hub of said spiders respectively and parallel shafts having bevel pinions meshing with said bevel gear rings respectively.

9. An automotive construction comprising a hollow housing, a gear carrier removably mounted thereon and having alined hangers inside of said housing, two alined spiders arranged end to end and provided at their outer ends with elongated hub portions journaled in said hangers, bevel ring gears secured to the adjacent ends of said spiders, a member with its ends journaled in the hub portions of said spiders and with its middle portion supporting the adjacent ends of said spiders, axle shafts removably engaged with the hubs of said spiders respectively, parallel shafts having bevel pinions meshing with said bevel gear rings respectively and also having intermeshing gears that are connected through a differential mechanism to a propeller shaft.

Signed at Detroit, Michigan, this 11th day of May, 1929.

LAURENCE R. BUCKENDALE.